United States Patent [19]

von Bonin

[11] 4,367,295

[45] Jan. 4, 1983

[54] INTUMESCENT COMPOSITIONS OBTAINED BY REACTING POLYISOCYANATES WITH PHOSPHORUS-CONTAINING PRODUCTS, POLYESTERS AND CYANURIC ACID AND/OR CYANURIC ACID DERIVATIVES

[75] Inventor: Wulf von Bonin, Leverkusen, Fed. Rep. of Germany

[73] Assignee: Bayer Aktiengesellschaft, Leverkusen, Fed. Rep. of Germany

[21] Appl. No.: 276,562

[22] Filed: Jun. 23, 1981

[30] Foreign Application Priority Data

Nov. 5, 1980 [DE] Fed. Rep. of Germany ....... 3041731

[51] Int. Cl.$^3$ .............................................. C08G 18/14
[52] U.S. Cl. ..................................... 521/165; 528/71; 528/72
[58] Field of Search .................... 521/165; 528/71, 72

[56] References Cited

U.S. PATENT DOCUMENTS

| | | | |
|---|---|---|---|
| 3,235,517 | 2/1966 | Beck et al. | 521/165 |
| 3,396,129 | 8/1968 | Yeadon et al. | 260/22 |
| 4,258,141 | 3/1981 | Jarre | 521/114 |

FOREIGN PATENT DOCUMENTS 863416  2/1971  Canada .

*Primary Examiner*—Maurice J. Welsh

*Attorney, Agent, or Firm*—Gene Harsh; Joseph C. Gil; Richard A. Elder

[57] ABSTRACT

The present invention relates to intumescent compositions, which may be foamed, and which are obtained by reacting:

(1) polyisocyanates with
(2) phosphorus-containing condensation products having at least one hydroxyl group obtainable by condensing (i) primary or secondary aliphatic, cycloaliphatic, aromatic, araliphatic or heterocyclic monoamines and/or polyamines, which mono- or polyamines may contain OH-groups; (ii) carbonyl compounds; and, (iii) dialkyl phosphites, and
(3) polyesters containing hydroxyl groups and having OH-numbers of from 140 to 300, obtained by reacting polycarboxylic acids containing from 2 to 10 carbon atoms with at least 2 polyols selected from two different groups of the following three:
  (a) hydroxyl compounds containing more than three OH groups and having molecular weights of up to 200,
  (b) hydroxyl compounds containing three OH groups and having molecular weights of up to 150,
  (c) hydroxyl compounds containing two OH-groups and having molecular weights of up to 80, with the proviso that at least one polyol is selected from group (a), and
(4) cyanuric acid and/or cyanuric acid derivatives and
(5) optionally water and/or other organic compounds containing isocyanate-reactive hydrogen atoms.

7 Claims, No Drawings

INTUMESCENT COMPOSITIONS OBTAINED BY REACTING POLYISOCYANATES WITH PHOSPHORUS-CONTAINING PRODUCTS, POLYESTERS AND CYANURIC ACID AND/OR CYANURIC ACID DERIVATIVES

BACKGROUND OF THE INVENTION

The present invention relates to intumescent compositions based on foamed or unfoamed polyurethanes which contain a combination of polyester polyols, cyanuric acid derivatives and phosphorus-containing hydroxyl compounds as part of the formulation thereof and which are plastic and elastic in character.

Intumescent compositions are generally understood to be materials which foam under the influence of fire or heat and, in doing so, form an insulating and fire-resistant foam which protects the areas situated behind the foam against fire. Such intumescent compositions are generally known in the form of lacquers, coatings and mortars or cements.

Good intumescent compositions should be able to at least double in volume on contact with a flame and, in addition, should be unaffected by water. It would be of particular commercial interest if these properties could be combined with the absence of halogen, with a low density, with good thermal insulating properties in the absence of stressing, and with plasticity or flexibility and/or elasticity. Elastic-plastic intumescent compositions characterized by high dimensional stability could be widely used in the field of fire prevention in the form of semi-finished products, such as tapes, sheetings, profiles, coatings, granulates or fillings.

The use of melamine in the production of flexible foams using substantially linear polyols, and preferably polyether polyols, is known (see e.g. German Offenlegungsschrift No. 2,815,554). Although foams of this type are flame-resistant and do not burn completely on exposure to a flame, they do not have the character of intumescent compositions. In other words, they do not undergo any increase in volume on exposure to a flame, forming a fire-repellent foam.

According to an earlier proposal, flame-resistant sealing compounds free from phosphorus and halogen may be produced using branched polyesters containing hydroxyl groups. Sealing compounds of this type are not intumescent, i.e., they do not foam on exposure to a flame.

In yet another proposal optionally foamed intumescent compositions are obtained by reacting:
(1) polyisocyanates with
(2) phosphorus-containing condensation products having at least one hydroxyl group obtainable by condensing (i) primary or secondary, aliphatic, cycloaliphatic, aromatic, araliphatic or heterocyclic monoamines and/or polyamines, which amino or polyamine may contain OH—groups, (ii) carbonyl compounds and (iii) dialkyl phosphites, optionally followed by alkoxylation, and
(3) aromatic hydroxy carboxylic acids or salts thereof and
(4) optionally water and/or other organic compounds containing isocyanate-reactive hydrogen atoms.

According to this proposal, polyesters containing hydroxyl groups and melamine may also be used. However, the polyesters in question are not the highly branched, i.e. polyfunctional, polyesters used in accordance with the present invention, but are instead linear polyesters. The products obtained are thus always rigid.

DESCRIPTION OF THE INVENTION

The present invention relates to intumescent compositions, which may be foamed, and which are obtained by reacting:
(1) polyisocyanates with
(2) phosphorus-containing condensation products having at least one hydroxyl group obtainable by condensing (i) primary or secondary aliphatic, cycloaliphatic, aromatic, araliphatic or heterocyclic monoamines and/or polyamines, which mono- or polyamines optionally may contain OH—groups; (ii) carbonyl compounds; and (iii) dialkyl phosphites, optionally followed by alkoxylation, and
(3) polyesters containing hydroxyl groups and having an OH—number of from 140 to 300, obtained by reacting polycarboxylic acids containing from 2 to 10 carbon atoms with at least two polyols selected from two different groups of the following three:
(a) hydroxyl compounds containing more than three OH groups and having molecular weights of up to 200,
(b) hydroxyl compounds containing three OH groups and having molecular weights of up to 150,
(c) hydroxyl compounds containing two OH groups and having molecular weights of up to 80, with the proviso that at least one polyol is selected from group (a), and
(4) cyanuric acid and/or cyanuric acid derivatives and
(5) optionally water and/or other organic compounds containing isocyanate-reactive hydrogen atoms.

According to the present invention, preferred intumescent compositions are obtained by reacting from 10 to 35 parts, by weight, of a polyisocyanate with 100 parts, by weight, of a mixture consisting of (a) from 5 to 50%, by weight, of phosphorus-containing condensation products containing at least one hydroxyl group, (b) from 30 to 70%, by weight, of polyesters, (c) from 7 to 40%, by weight, of cyanuric acid and/or derivatives, and (d) from 0 to 10%, by weight, of water and/or from 0 to 25%, by weight, of other organic compounds containing isocyanate-reactive hydrogen atoms.

Particularly preferred intumescent compositions are based on polyisocyanates of the type obtained by condensing aniline with formaldehyde, followed by phosgenation, and phosphorous containing products corresponding to the following formula:

$(RO)_2PO-CH_2-N+CHX-CHX-OH)_2$ wherein
R represents $C_1-C_8$ alkyl or $C_1-C_8$ hydroxyalkyl; and
X represents H or methyl.

The present invention also relates to the use of the new intumescent compositions for filling cavities, for sealing gaps and for intumescent coatings. When they have been produced by reaction in molds or by subsequent forming of the fully reacted reaction mixtures, the invention also relates to the use of the compositions herein for the production of intumescent moldings.

Highly flexible, intumescent compositions, which may be foamed, are obtained in accordance with the present invention. In the case of the foamed compositions, it has also surprisingly been found that they have the character of water-resistant, plastic-elastic foamed compositions; in other words they may readily be compressed and recover only slowly, returning to the original shape thereof. This unexpected behavior may be regarded as particularly advantageous from the technical point of view, for example in cases where intumescent compositions of the type in question must be introduced in the form of prefabricated tapes or other shaped articles into dimensionally irregular gaps or cavities in which they subsequently expand and fill the gap.

Plastic, elastic or plastic-elastic intumescent compositions of the type obtained in accordance with the present invention are of particular commercial interest (i) because preforms produced from them may be readily pressed into gaps or cavities, (ii) because they may also be used for sheathing cables and lagging pipes and (iii) because the effectiveness thereof is not in any way impaired by vibration. The considerable resistance thereof to water is another interesting technical advantage.

The soft, flexible intumescent compositions obtainable in accordance with the present invention are by nature flame-resistant without any need for halogen compounds to be used. On exposure to a flame, they foam to 10 times the original volume and, in doing so, form a fire-resistant foam which screens the areas behind it from the flame.

They may also be thermoplastically processed in the vicinity of (i.e. below) the foaming temperature thereof. Providing the temperature prevailing during thermoplastic processing (for example by molding or extrusion) into moldings is suitably controlled, the moldings obtained may be foamed or non-foamed in character. The thermoplastic behavior of the compositions under certain processing conditions may also be used for modifying moldings; for example sheets of foamed material may be used for separating or welding other materials or even for stamping or permanent deformation.

The new intumescent materials may be produced either continuously or in batches. Production may be carried out by mixing the components or pre-mixed component mixtures in situ and pouring the reaction mixture by machine or by hand, under pressure or in the absence of pressure, for example into openings to be closed into heated or unheated molds where they subsequently foam and harden. They may be sprayed, coated or cast onto the substrates to be protected providing the substrates have been suitably treated as recognized in the art. It is also possible initially to convert the reaction mixtures according to the present invention into semi-finished products, for example foams, profiles or coatings, and then to further process these semi-finished products in the manner required, for example by cutting, thermoforming, granulation, grinding, mixing, coating or bonding.

By combining the reaction mixtures with various inorganic or organic additives (such as polystyrene foam, polyurethane foam, phenoplasts, aminoplasts or gravel or expanded clay, urea or phenolic resin foams, foamed glass, glass fibers, wood, mineral wool, pumice, and the like) it is also possible to obtain composite materials characterized by particular intumescent properties. The intumescent compositions according to the present invention may also be used for the production of moldings reinforced by fibers, wires, woven fabrics, strands or mats of organic or inorganic material or as a constituent of multiple layer or sandwich-type materials. They may also be combined with other organic or inorganic intumescent materials.

Suitable fillers, which may be used individually or in combination, include in particular aluminum oxide hydrates, chalk, kaolin, glass and solid or hollow beads of silcate-based material (for example so-called "microballoons"). In addition to hollow beads, it is preferred to use aluminum oxide hydrates because of the dehydratability thereof.

Suitable isocyanates useful according to the present invention include aliphatic, cycloaliphatic, araliphatic, aromatic and heterocyclic polyisocyanates of the type known in the art and described, for example, by W. Siefken in Justus Liebigs Annalen der Chemie, 562, pages 75 to 136. Particularly useful are isocyanates corresponding to the following general formula:

$$Q(NCO)_n$$

wherein
n=2–4, preferably 2; and
Q represents an aliphatic hydrocarbon radical containing from 2 to 18, preferably from 6 to 10, carbon atoms, a cycloaliphatic hydrocarbon radical containing from 4 to 15, preferably from 5 to 10, carbon atoms, an aromatic hydrocarbon radical containing from 6 to 15, preferably from 6 to 13, carbon atoms or an araliphatic hydrocarbon radical containing from 8 to 15, preferably from 8 to 13, carbon atoms. Specific isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of such isomers; 1-isocyanato-3,3,5-trimethyl-5-isocyanatomethyl cyclohexane (German Auslegeschrift No. 1,202,785, U.S. Pat. No. 3,401,190); 2,4- and 2,6-hexahydrotolylene diisocyanate and mixtures of such isomers; hexahydro-1,3- and/or 1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of such isomers; diphenyl methane-2,4'-and/or -4,4'-diisocyanate; naphthylene-1,5-diisocyanate; and the like.

According to the present invention, it is also possible, for example, to use triphenyl methane-4,4',4''- triisocyanate; polyphenyl polymethylene polyisocyanates of the type obtained by condensing aniline with formaldehyde, followed by phosgenation, and described, for example, in British Pat. Nos. 874,430 and 848,671; m- and p- isocyanatophenyl sulphonyl isocyanates as described in U.S. Pat. No. 3,454,606; perchlorinated aryl polyisocyanates of the type described, for example, in U.S. Pat. No. 3,277,138; polyisocyanates containing carbodiimide groups of the type described in U.S. Pat. No. 3,152,162, and in German Offenlegungsschriften Nos. 2,504,400; 2,537,685; and 2,552,350; norbornane diisocyanates as described in U.S. Pat. No. 3,492,330; polyisocyanates containing allophanate groups of the type described in British Pat. No. 994,890, Belgian Pat. No. 761,626 and Dutch Patent Application No. 7,102,524; polyisocyanates containing isocyanurate groups of the type described in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups of the type described in Belgian Pat. No. 752,261 or in U.S. Pat. Nos. 3,394,164 and 3,644,457; polyisocyanates containing acylated urea groups as described in German Pat. No. 1,230,778; polyisocyanates containing biuret groups of the type described, for example in U.S. Pat. Nos. 3,124,605; 3,201,372 and in British Pat. No. 889,050; polyisocyanates produced by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid esters as described in U.S. Pat. No. 3,455,883. It is also possible to use the isocyanate group-containing distillation residues obtained in the commercial production of isocyanates, optionally in solution in one or more of the above-mentioned polyisocyanates. It is also possible to use mixtures of any of the above-mentioned polyisocyanates.

In general, it is particularly preferred to use the commercially available polyisocyanates such as 2,4- and 2,6-tolylene diisocyanate, and mixtures of such isomers ("TDI"); polyphenyl polymethylene polyisocyanates of the type obtained by condensing aniline with formaldehyde, followed by phosgenation ("crude MDI") and polyisocyanates containing carbodiimide groups, urethane groups, allophonate groups, isocyanurate groups, urea groups or biuret groups ("modified polyisocyanates"), and particularly modified polyisocyanates of the type derived from 2,4- and/or 2,6-tolylene diisocyanate or from 4,4'- and/or 2,4'-diphenyl methane diisocyanate.

Suitable phosphorus-containing materials are also known in the art. The phosphorus-containing condensation products have at least one hydroxyl group and are obtained, for example, by condensing (i) primary or secondary aliphatic, cycloaliphatic, aromatic, araliphatic or heterocyclic mono- and/or poly-amines, which mono- or polyamines may optionally contain OH—groups; (ii) carbonyl compounds, and (iii) dialkyl phosphites. The condensation reaction may optionally be followed by alkoxylation. Such condensation products are known and are described for example, in German Pat. No. 1,143,022, U.S. Pat. No. 3,076,010, and German Auslegeschriften Nos. 1,803,747 and 1,928,265.

According to the present invention, preferred phosphorus-containing condensation products having at least two hydroxyl groups correspond to the following general formula:

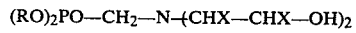

$(RO)_2PO—CH_2—N—(CHX—CHX—OH)_2$ wherein
R represents $C_1$-$C_8$ alkyl or $C_1$-$C_8$ hydroxyalkyl, preferably ethyl or hydroxy ethyl; and
X represents H or methyl, preferably H.

Polyesters useful according to the present invention contain hydroxyl groups and have OH—numbers of from 140 to 300. They are obtained by reacting aliphatic, cycloaliphatic, araliphatic and aromatic polycarboxylic acids containing from 2 to 10 carbon atoms with at least two polyols selected from two different groups of the following three:
(a) hydroxyl compounds containing more than three OH—groups and having a molecular weight of up to 200,
(b) hydroxyl compounds containing three OH—groups and having a molecular weight of up to 150,
(c) hydroxyl compounds containing two OH—groups and having a molecular weight of up to 80, with the proviso that at least one polyol is selected from group (a).

The molar ratios between these polyols is in general as follows (if 6 mols of a dicarboxylic acid are applied in the preparation of a polyester):
a:b=(4,5–6,5):(0,1–1,5),
preferably (5–6):(0,2–1)
a:c=(4,5–6,5):(0,5–1,2),
preferably (5–6):1

Furthermore following molar ratios between a dicarboxylic acid and the above mentioned polyols are usually applied:

| dicarboxylic acid = 6 preferably 6 | a + b + c (6,1–7,5), (6,5–7,1) |
|---|---|

Suitable polycarboxylic acids are of the type known in the art. Benzene dicarboxylic acids and aliphatic polycarboxylic acids containing from 3 to 10 carbon atoms are preferred. Phthalic acid and terephthalic acid are suitable benzene dicarboxylic acids. The aliphatic polycarboxylic acids used are preferably those containing from 3 to 8 carbon atoms, such as citric acid, oxalic acid, maleic acid, fumaric acid, and succinic acid. Adipic acid is preferred by virtue of its ready availability.

Of the hydroxyl compounds belonging to group (a) pentaerythritol is preferred, although it is possible, for example, to use mannitol, sorbitol, xylitol, formitol, and the like.

Of the hydroxyl compounds belonging to group (b), glycerol is preferred, although it is possible to use trimethylol propane, triethanolamine, and the like.

Of the hydroxyl compounds belonging to group (c), ethylene glycol is preferred.

The polyesters used will generally have viscosities at 75° C. of from 1000 to 8000 cP with viscosities of from 1200 to 5000 cP at 75° C. being preferred. The acid numbers should be below 10, preferably between 0 and 5. The molecular weights are generally from 500 to 2000, preferably from 600 to 1500, while the OH-numbers are from 140 to 300, and preferably from 170 to 220.

Cyanuric acid and/or derivatives thereof useful in the present invention include cyanuric acid or compounds which are generally regarded as cyanuric acid or isocyanic acid derivatives. Such compounds include for example, cyanamide, dicyanamide, dicyanodiamide, guanidine and salts thereof, biguanide, melamine cyanurate, cyanuric acid salts and cyanuric acid esters and amides. Melamine is particularly preferred because of its ready availability.

In the context of the present invention, melamine is understood to be the substance 2,4,6-triamino-s-triazine, although it is also possible for example, to use condensation products thereof obtainable by heat treatment or by reaction with formaldehyde.

Water and/or other organic compounds containing isocyanate-reactive hydrogen atoms may also be used herein. Suitable isocyanate-reactive compounds include:
(a) Compounds containing at least two isocyanate-reactive hydrogen atoms and having molecular weights of from 400 to 10,000. In addition to compounds containing amino groups, thiol groups or carboxyl groups particularly preferred are those containing hydroxyl groups, and particularly compounds containing from 2 to 8 hydroxyl groups. Most preferred are hydroxyl groups containing compounds having molecular weights from 1000 to 6000, preferably from 1000 to 3000. Suitable compounds include polyesters, polyethers, polythioethers, polyacetals, polycarbonates and polyester amides containing at least 2, generally from 2 to 8, but preferably from 2 to 4, hydroxyl groups, of the type known for the production of non-cellular and cellular polyurethanes. According to the present invention, it is preferred to use polyesters.

The polyesters containing hydroxyl groups suitable for use in accordance with the present invention include for example, reaction products of polyhydric, preferably dihydric, and, optionally, trihydric, alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or they may be unsaturated. Examples of such carboxylic acids and derivatives thereof are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids, such as oleic acid, terephthalic acid dimethyl ester and terephthalic acid bis-glycol ester. Examples of suitable polyhydric alcohols include ethylene glycol; 1,2- and 1,3-propylene glycols; 1,4- and 2,3-butylene glycols; 1,6-hexane diol; 1,8-octane diol; neopentyl glycol; 1,4-bis-hydroxymethyl cyclohexane; 2-methyl-1,3-propane diol; glycerol; trimethylol propane; 1,2,6-hexane triol; 1,2,4-butane triol; trimethylolethane; pentaerythritol; quinitol; mannitol; sorbitol; formitol; methyl glycoside; diethylene glycol; triethylene glycol; tetraethylene glycol and higher polyethylene glycols; dipropylene glycol and higher polypropylene glycols; dibutylene glycol and higher polybutylene glycols. The polyesters may contain terminal carboxyl groups. Polyesters of lactones, for example ε-caprolactone, or of hydroxy carboxylic acids, for example ω-hydroxy caproic acid, may also be used.

The polyethers containing at least 2, generally from 2 to 8, preferably 2 or 3 hydroxyl groups suitable for use in accordance with the present invention are also known and are obtained, for example, by polymerizing epoxides, such as ethylene oxide, propylene oxide, butylene oxide, tetrahydrofuran, styrene oxide or epichlorohydrin, on their own, for example in presence of Lewis catalysts, such as $BF_3$, or by the addition of these epoxides, preferably ethylene oxide and propylene oxide, optionally in admixture or successively, with starter components containing reactive hydrogen atoms, such as water, ammonia, alcohols or amines. Sucrose polyethers of the type described, for example in German Auslegeschriften Nos. 1,176,358 and 1,064,938 and formitol- or formose-started polyethers (see, e.g. German Offenlegungsschriften Nos. 2,639,083 and 2,737,951) may also be used in accordance with the present invention.

Representatives of the above-mentioned compounds are known and are described, for example, in High Polymers, Vol. XVI, "Polyurethanes, Chemistry and Technology", by Saunders-Frisch, Interscience Publishers, New York/London, Vol. 1, 1962, pages 32 to 42 pages 44 to 54 and Vol. II, 1964, pages 5–6 and 198–199, and in Kunststoff-Handbuch, Vol. VII, Vieweg-Hochtlen, Carl-Hanser-Verlag, Munich, 1966, for example on pages 45 to 71. It is, of course, possible to use mixtures of the above-mentioned compounds containing at least 2 isocyanate-reactive hydrogen atoms and having a molecular weight of from 400 to 10,000, for example mixtures of polyethers and polyesters.

(b) Compounds containing at least 2 isocyanate-reactive hydrogen atoms and having molecular weights of 32 to 400. In this case, too, the compounds in question include compounds containing hydroxyl groups and/or amino groups and/or thiol groups and/or carboxyl groups. Preferred are compounds containing hydroxyl groups and/or amino groups which serve as chain-extenders or cross-linkers. These compounds generally contain from 2 to 8, and preferably from 2 to 4, isocyanate-reactive hydrogen atoms.

In this case, too, it is possible to use mixtures of different compounds containing at least 2 isocyanate-reactive hydrogen atoms and having a molecular weight of from 32 to 400. Examples of such compounds include ethylene glycol; 1,2- and 1,3-propylene glycol; 1,4- and 2,3-butylene glycol; 1,5-pentane diol; 1,6-hexane diol; 1,8-octane diol; neopentyl glycol; 1,4-bis-hydroxymethyl cyclohexane; 2-methyl-1,3-propane diol; glycerol; trimethylol propane; 1,2,6-hexane triol; sorbitol; castor oil; diethylene glycol; triethylene glycol; tetraethylene glycol; higher polyethylene glycols having a molecular weight of up to 400, dipropylene glycol; higher polypropylene glycols having a molecular weight of up to 400; dibutylene glycol; higher polybutylene glycols having a molecular weight of up to 400; 4,4'-dihydroxy diphenyl propane; dihydroxy methyl hydroquinone; ethanolamine; diethanolamine; N-methyl diethanolamine; triethanolamine and 3-aminopropanol.

Other low molecular weight polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (see, e.g., German Offenlegungsschriften Nos. 2,639,084; 2,714,084; 2,714,104; 2,721,186; 2,738,154 and 2,738,512). In order to obtain plastics having improved flame resistance, these formoses are advantageously used in combination with aminoplast-formers and/or phosphites (see, e.g., German Offenlegungsschriften Nos. 2,738,513 and 2,738,532). Solutions of polyisocyanate polyaddition products, and particularly solutions of polyurethane ureas containing ionic groups and/or solutions of polyhydrazodicarbonamides, in low molecular weight polyhydric alcohols may also be used as polyol component (see, e.g., German Offenlegungsschrift No. 2,638,759).

Aliphatic diamines suitable for use in accordance with the present invention include, for example, ethylene diamine; 1,4-tetramethylene diamine; 1,11- undecamethylene diamine; 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenyl methane; p-xylylene diamine, bis-(3-aminopropyl)-methylamine; diamino-perhydro-anthracenes (German Offenlegungsschrift No. 2,638,731) and cycloaliphatic triamines as described in German Offenlegungsschrift No. 2,614,244. Hydrazine and substituted hydrazines, for example methyl hydrazine, N,N'-dimethyl hydrazine and homologues thereof, as well as acid hydrazides may also be used in accordance with the present invention. Examples of aromatic diamines include bis-anthranilic acid esters as described in German Offenlegungsschriften Nos. 2,040,644 and 2,160,590; 3,5- and 2,4-diaminobenzoic acid esters as described in German Offenlegungsschrift No. 2,025,900, the diamines containing ester groups described in U.S. Pat. Nos. 3,681,290 and 3,736,350 and German Offenlegungsschriften Nos. 2,040,650 and 2,160,589; the diamines containing ether groups as described in German Offenlegungsschriften Nos. 1,770,525 and 1,809,172 (U.S. Pat. Nos. 3,654,364 and 3,736,295); 2-halogen-1,3-phenylene diamines optionally substituted in the 5-position (German Offenlegungsschriften Nos. 2,001,772; 2,025,896 and 2,065,869); 3,3'-dichloro-4,4'-diaminidiphenyl methane; tolylene diamine and 4,4'-diaminodiphenyl methane.

It has been found that the conventional stoichiometric ratios in classical polyurethane chemistry are not essential to obtain the advantageous properties of the new intumescent composition, and particularly the intumescent foams. Thus, components (2), (3), (4) and optionally (5) are combined irrespective of the stoichiometry normally required in isocyanate chemistry and the resultant mixture is reacted in simple preliminary tests with different quantities of the polyisocyanate in order empirically to determine the optimal amount required.

The approximate quantities thus determined for the individual components (2), (3), (4) and, optionally (5) in the reaction mixture to be reacted with the polyisocyanate add up to 100% and amount to between 5 and 50%, by weight, preferably to between 15 and 25%, by weight, for the phosphorus-containing condensation products containing at least one hydroxyl group (2):

to between 30 and 70%, by weight, preferably to between 60 and 45%, by weight, for the highly branched polyesters (3):

to between 7 and 40%, by weight, preferably to between 15 and 30%, by weight, for the cyanuric acid derivatives (4):

to between 0 and 10%, by weight, preferably to between 0 and 3%, by weight for water (5):

to between 0 and 25%, by weight preferably to between 0 and 15%, by weight, for the other organic compound containing isocyanate-reactive hydrogen atoms.

In general, 100 parts, by weight, of this reaction mixture are reacted with from 10 to 35 parts, by weight, preferably from 15 to 25 parts, by weight, of the polyisocyanate.

Production of the intumescent compositions may be carried out in a solvent, although it is preferably carried out in the absence of solvents. Foams are of particular interest. They may have densities of from about 40 to 900 kg/m$^3$, preferably from 100 to 600 kg/m$^3$. A particularly well-balanced combination between low density which is required for reasons of insulation capacity, and mass per unit volume which is required for the foaming effect on contact with a flame is represented by foams of the present invention having densities of from about 150 to 500 kg/m$^3$.

The various reaction components may be individually combined. However, it is preferred to prepare a preliminary mixture from the reactive components (2), (3), (4) and, (5). A liquid reaction component in which all the necessary constituents, except for the polyisocyanate, are present is obtained in this way, optionally after brief heating. In this way, the intumescent compositions according to the present invention may be formulated as or produced from a 2-component mixture. The machines normally encountered in polyurethane technology may be used for this purpose. Further components, such as urea, urea condensates, formaldehyde condensates, phenolic resins, phosphates, aminopolyphosphates, phosphoric acid esters, such as tricresyl phosphate or dibutyl cresyl phosphate, aluminum oxide hydrates, glass powders, vermiculite, solid or hollow glass or other silicate beads and other additives which modify burning properties, may readily be added to the preliminary mixture of components and, optionally, even to the isocyanate.

Although surprisingly it is not necessary in the production of the optionally foamed intumescent compositions according to the present invention to use catalysts for the foam-forming reaction or other auxiliaries of the type otherwise normally used in the chemistry of foams, for example gaseous or low-boiling blowing agents or compounds which give off blowing gases, it is, of course, possible to use these additives as well as emulsifying, separating, coloring, preserving, hydrolysis-inhibiting, odoriferous or other additives as part of the formulation. For example, the use of catalysts giving rise to carbodiimide formation, (for example, phospholine oxides, such as 1-methyl-1-oxophospholine) leads to intumescent compositions characterized by improved resistance to hydrolysis.

It is also possible to include in the formulation of intumescent compositions according to the present invention additives of the type which are capable of helping to increase foaming in the event of contact with a flame. Additives of this type include, for example, aliphatic and, in particular aromatic hydroxy carboxylic acids, such as salicylic acid or p-hydroxybenzoic acid or compounds which give off water, carbohydrates, nitrogen or $CO_2$ at elevated temperature, such as triazoles, azodicarbonamides, sulphohydrazides or ureadicarboxylic acid anhydride.

The intumescent compositions according to the present invention may be converted, for example by molding or casting and gelation, by cutting or melting, into shaped articles which foam at temperatures of from about 200° to 350° C. and thus prevent flame propagation, i.e., which are suitable for use as sealing elements, safety devices, fire barriers. Gaps may be filled and cable openings sealed. For this purpose, it is possible, for example, to use a type of concrete produced from the intumescent composition and stones and/or expanded particles, such as expanded clay, expanded glass, vermiculite, Perlite and the like and/or even foam beads based, for example, on polystyrene.

It is also of interest to produce optionally reinforced coatings of virtually any thickness on metal (for example steel girders and panels), wood (for example door panels or roof beams), on masonary, on plastics, whether cable insulations or foam sheeting. If the coatings are applied to a load-bearing panel or supporting structure (for example to an expanded metal panel, to a honeycomb panel of metal, cardboard, paper, wood, ceramics or plastics), fire-retardant panels or wall elements may readily be produced.

The intumescent compositions are also of interest for the production of anti-vibration coatings or noise-insulating elements.

The intumescent compositions according to the present invention may also be used for lining the interior of fire-retardant doors with a coating which foams in the event of fire and has an insulating effect, and also for the production of door and other seals which foam in the event of fire and seal off the gap in front of them. Sealing profiles, for example of elastic material, may also be filled or back-filled with the intumescent compositions according to the present invention. A fire-retarding seal is obtained in this way. By suitable arrangement, it is possible to build up in chimneys, ventilation and air conditioning installations, pipes and inlet/outlet openings, barriers which, if heated to from about 200° to 400° C., retard or prevent the further passage of gases. Such arrangement includes, for example, stacks of plates arranged parallel to one another at narrow intervals, screens of perforated plates coated with the intumescent compositions or pipe sections loosely filled with granulates of the intumescent compositions may also be used as filter elements for gases which close in the event of an excessive increase in temperature.

It is also possible, for example, to foam shaped articles readily obtainable from the intumescent compositions or even granulates differing widely in grain size in one or more stages by heating them to temperatures above 200° C., preferably from 250° to 1800° C., more particularly from 250° to 800° C. Foaming may be carried out freely or in closed or open molds, in which case the molds are preferably provided with openings for the escape of air and vapors. Fire-repellent foams, so-called "carbonizing foams", are formed in this case.

Heating may be carried out by radiation, by treatment with superheated stem or hot air or other hot gases, by microwaves or high-frequency or by thermal conduction in air or liquid baths or metal baths.

The intumescent compositions according to the present invention may also be applied to support materials and foamed thereon; for example by coating expanded clay particles, pouring into a mold and heating therein, resulting in the formation of a block of expanded clay embedded in carbonizing foam. A correspondingly coated sheet of wood or iron may be processed at about 250° C. to form a composite foam sheet. In this case, the surface of the foam may be covered by another sheet of wood or iron.

The intumescent compositions according to the present invention may also be used for filling cavities with foam, for example in cable ducts, and also in clay bricks and other building materials, which may be done, for example, by introducing the reaction mixtures or completed intumescent foams in a suitable quantity into the cavity of the cold or still warm brick.

The intumescent compositions according to the present invention may also be used for insulating pipes and cables in the form of half-shells or complete jackets. It is advantageous in this respect that insulation may also be carried out in situ by coating the pipe or pipe section to be insulated with the reaction mixture and subsequently foaming the mixture.

The reaction mixtures leading to the intumescent compositions according to the present invention may be produced and processed continuously or in batches. The components may be combined individually or in the form of mixtures. It is preferred to combine all the reaction components, apart from the isocyanate, so that two-component processing is possible, for example in conventional hand-stirred or mechanically-stirred vessels, in stirrer-equipped or jet-type mixing heads or in static mixers, of the type commonly used in polyurethane chemistry. The reaction may be completed in cooled, cold or heated molds under pressure or in the absence of pressure.

The following description of tests is intended to illustrate the present invention without limiting it in any way. The parts and percentages quoted represent parts, by weight, or percentages, by weight, unless otherwise indicated.

The following series of tests are intended to illustrate the connection between the formulation and the properties of the intumescent compositions obtainable in accordance with the present invention.

To this end, the following components were used: as the polyisocyanate (1), a conventional commercial polyisocyanate isomer mixture (NCO content: 30-32% by weight; Desmodur ® 44 V 10 of Bayer AG, Germany) obtained by phosgenating aniline/formaldehyde condensates and containing approximately 90% of binuclear diisocyanates and approximately 10% of polynuclear polyisocyanates, as the highly branched polyester (3), a polyester of approximately 6 moles of adipic acid, approximately 1 mole of pentaerythritol, approximately 0.25 mole of glycerol and approximately 5.25 moles of ethylene glycol having an OH-number of 199.6; an acid number of 4.2; a viscosity of 75° C. of 4470 cP and a functionality of 4.25, as the phosphorus-containing condensation product (2), technical $(C_2H_5O)_2POCH_2N(C_2H_4OH)_2$, referred to herein as P-diol (2).

The first test relates to the variation to the amount of cyanuric acid derivative (i.e., in this test melamine):

| Example | 1 | 2 | 3 | 4 | 5 | 6 |
|---|---|---|---|---|---|---|
| melamine parts | 27 | 23 | 17 | 10 | 5 | 0.5 |
| water parts | 0.5 | 0.5 | 0.5 | 0.5 | 0.5 | 0.5 |
| polyester parts | 43 | 43 | 43 | 43 | 43 | 43 |
| P-diol parts | 14 | 14 | 14 | 14 | 14 | 14 |

This mixture is stirred with 15 parts of polyisocyanate at room temperature. The thus-obtained reaction mixture begins to foam about 50 seconds after the beginning of mixing. The reaction is over after about 5 minutes. According to Example 2, a foam having a density of about 250 kg/m³ is formed.

All the foams are soft, flexible foams increasing in softness from 1 to 6. All show the effect whereby they recover only slowly after compression, so that they may readily be introduced into gaps in compressed form, for example in the form of cut tapes, subsequently filling the gap by expansion. Compression is carried out either by hand or by passage between two squeezing rollers.

If a cylinder 3 cm in diameter and 10 cm long is compressed for five seconds at 20° C. to a 5 cm length sample 1 takes about 10 seconds and sample 6 about 45 seconds to return to the original volume thereof.

In order to test the foams for the behavior thereof on exposure to a flame, sample 1.5 cm cubes are laterally exposed to a Bunsen flame on a metal grid. In every case, the foam does not burn, but instead carbonizes. In cases 1 to 3, the flame goes out immediately when the Bunsen burner is briefly removed during the test period, in cases 5 and 6 the flame continues burning for longer than 5 seconds and, in case 4, for less than 5 seconds. In cases 1 to 3, the test specimens foam to several times the original volume thereof on exposure to the Bunsen flame, in case 4 slight foaming is observed, while in cases 5 and 6, the foam shrinks away on exposure to the Bunsen flame. Samples 1 to 4 are suitable for use as intumescent compositions, samples 1 to 3 being preferred.

If the amount of water used in Examples 1 to 6 is doubled, the foamed intumescent compositions formed have densities reduced by about 25% and are even softer with basically the same behavior on exposure to a flame. The relaxation times in the compression test described above increase by about 50 to 100%.

The next series of tests relates to variation of the quantity of polyester and P-diol:

| Example | 7 | 8 | 9 | 10 | 11 | 12 |
|---|---|---|---|---|---|---|
| melamine parts | 23 | 23 | 23 | 23 | 23 | 23 |
| water parts | 0.5 | 0.5 | 0.5 | 0.5 | 0.5 | 0.5 |
| polyester parts | 50 | 45 | 43 | 40 | 30 | 20 |
| P-diol parts | 7 | 12 | 14 | 17 | 27 | 37 |

The mixture is thoroughly stirred with 15 parts of polyisocyanate in a mixing chamber. The foaming reaction, which is accompanied by moderate heating, is over after 5 minutes. A foam having a density of approximately 280 kg/m$^3$ is obtained in Example 9. Samples 7 to 10 are foams, sample 11 may be regarded as a viscous, elastic and porous mass having the consistency of plasticine, while sample 12 is a tacky, viscous porous cement. The relaxation test described in Examples 1 to 6 gives the following relaxation times:

Example 7: less than 3 seconds
Example 8: approximately 5 seconds
Example 9: approximately 10 seconds
Example 10: approximately 35 seconds On exposure to a flame under the same conditions as in Examples 1 to 6, it was found that none of the samples burn, but instead carbonize. If the burner is briefly removed, sample 7 continues burning for less than 5 seconds, while none of the other samples continues burning. All the samples foam to more than twice the original volume thereof. The tendency towards foaming increases from sample 7 to sample 12.

In principle, all the samples may be used as intumescent compositions. The foams obtainable in accordance with Examples 7 to 10 and particularly the material obtainable in accordance with Example 9 are suitable, for example in the form of preformed plugs, tapes or profiles, for filling and sealing gaps or, when prepared in situ, for introduction into cavities to be protected against fire by subsequent filling with foam. Samples 11 and 12 may in principle be used as elastic intumescent cements providing the pronounced tackiness of sample 12 may be tolerated.

The next series of tests relates to variation of the quantity of polyisocyanate:

| Example | 13 | 14 | 15 | 16 | 17 | 18 | 19 | 20 | 21 | 22 | 23 |
|---|---|---|---|---|---|---|---|---|---|---|---|
| melamine parts | 23 | 23 | 23 | 23 | 23 | 23 | 23 | 23 | 23 | 23 | 23 |
| water parts | 0.5 | 0.5 | 0.5 | 0.5 | 0.5 | 0.5 | 0.5 | 0.5 | 0.5 | 0.5 | 0.5 |
| polyester parts | 43 | 43 | 43 | 43 | 43 | 43 | 37 | 37 | 37 | 37 | 37 |
| P-diol parts | 14 | 14 | 14 | 14 | 14 | 14 | 20 | 20 | 20 | 20 | 20 |
| polyisocyanate parts | 7 | 13 | 16 | 20 | 27 | 35 | 7 | 13 | 20 | 27 | 35 |

The products obtained may be described as follows:

Sample 19 substantially corresponds to sample 12 in its consistency and behavior on exposure to a flame. Samples 13 and 20 substantially correspond to sample 11 in the consistency and behavior on exposure to a flame thereof.

Samples 14, 15, 16, 21 and 22 are flexible soft foams characterized by densities of from 220 to 350 kg/m$^3$. They have relaxation times (determined in the same way as in Examples 1 to 6) of from 5 to 45 seconds. On exposure to a flame under the same conditions as in Examples 1 to 6, after-burning times of less than 3 seconds are observed, the foams undergoing an increase in volume of more than 100% to form a fire-retardant carbonizing foam. In contrast to samples 19, 13 and 20 which may only be used as cements, samples 14, 15, 16, 21 and 22 may be processed to form flexible moldings, for example profiles, characterized by good intumescent properties, for example by cutting the foamed intumescent compositions produced in block form.

Samples 17 and 23 are viscous, substantially incompressible foams which are suitable, for absorbing energy. On exposure to a flame, they continue burning for less than 10 seconds, undergoing only a minimal increase in volume. Sample 18 has hardly any intumescent properties, in other words no foaming is observed on exposure to a flame, and continues burning for about 10 seconds and longer. This type is unsuitable for use as an intumescent composition.

This series of tests relates to variation of the ratio of cyanuric acid derivative and polyisocyanate:

| Example | 24 | 25 | 26 | 27 | 28 |
|---|---|---|---|---|---|
| melamine parts | 21 | 22 | 23 | 24 | 25 |
| water parts | 0.5 | 0.5 | 0.5 | 0.5 | 0.5 |
| polyester parts | 45 | 45 | 45 | 45 | 45 |
| P-diol parts mixed with polyisocyanate parts | 15 | 15 | 15 | 15 | 15 |
|  | 18.5 | 17.5 | 16.5 | 15.5 | 14.5 |

In every case, soft, foamed intumscent moldings hardening after about 5 minutes are obtained when the freshly prepared reaction mixtures are poured into a beaker mold and left to foam therein.

The densities vary from about 230 to 300 kg/m$^3$ from samples 24 to 28, while the relaxation times (determined as described above) vary from about 10 seconds to about 40 seconds. On exposure to a flame, no after-burning is observed, all the samples undergoing an increase in volume of more than 100%. Although in principle all samples 24 to 28 are suitable for use as intumescent foams, sample 27 is the most suitable in terms of its balanced combination of flexibility, density and burning characteristics.

In Example 27, a reaction mixture is prepared and applied to a moving belt through a nozzle in the form of a strand approximately 1.3 cm in diameter. The material foams on the belt into a quasi-endless profile of intumescent foam having a semicircular cross-section and may subsequently be rolled up and used as a gapfilling cord having intumescent properties.

EXAMPLE 29

The procedure is as described in Example 26, except that finely powdered dicyanodiamide is used instead of melamine. A soft intumescent foam having comparable mechanical properties is obtained. On exposure to a flame, this foam is distinguished from the foam of Example 26 by the fact that the increase in volume is considerably more intensive. The same observation is made when the melamine in Example 26 is replaced by a mixture of equal parts of melamine and dicyanodiamide.

EXAMPLE 30

The procedure is as in Example 27, except that, instead of the polyisocyanate (1) used in that Example, a similarly obtained technical polyisocyanate (1) having a polynuclear component of about 40% rather than 10% and having a NCO content of 28–32% by weight (Desmodur ® 44 V 40 of Bayer AG, Germany) is used. A soft intumescent foam is obtained, differing from the foam of Example 27 solely in its relaxation time which is approximately 20% shorter for a density of the order of 280 kg/m$^3$. On exposure to a flame, no after-burning is observed for an increase in volume of more than 100%.

EXAMPLE 31

The procedure is as in Example 27, except that a polyester of 6 moles of adipic acid, 6 moles of ethylene glycol and 1 mole of pentaerythritol having an OH-number of 197.2; an acid number of 2.3 and a viscosity at 75° C. of 1997 cP is used instead of polyester (3).

A flexible intumescent foam is obtained, having exactly the same properties as the foam of Example 27. If a polyester of 5 moles of adipic acid, 1 mole of terephthalic acid, 6 moles of ethylene glycol and 1 mole of pentaerythritol is similarly used, the intumescent foam obtained is distinguished from the material obtained in accordance with Example 27 by an approximately 20% shorter relaxation time for the same intumescent behavior.

EXAMPLE 32

A slot approximately 10 cm long and 1 cm wide is cut into an approximately 1 cm thick clay plate. The plate is then laid flat on a polyethylene film and the slot filled with the reaction mixture according to Example 27. After foaming, the material which has foamed out of the slot beyond the surface of the plate is cut off in such a way that an approximately 2 mm wide overlap of the intumescent composition beyond the surface of the plate is left intact, in other words the foam introduced into the slot has a substantially T-shaped profile and a thickness of the order of 1.3 cm. The thus-treated plate is then placed over a Bunsen burner in such a way that the underneath of the plate, i.e. the intumescent composition filling the slot, is situated substantially in the middle between the outer edge of the non-luminous natural gas flame and the inner, blue cone of the flame. The flame test is carried out in this position without the filling of the slot being burnt through by the flame after 90 minutes.

EXAMPLE 33

An intumescent foam produced in accordance with Example 27 is cut into cubes having an edge of 1.5 cm. Some of these cubes are placed in 1 liter of water and stored beneath the surface of the water for 8 days by means of a net. The cubes are then dried and subjected to the flame test in the same way as in Examples 1 to 6. Compared with the reference material which had not been stored under water, the intumescent properties have remained intact and foaming behavior has deteriorated only slightly.

EXAMPLE 34

The gap filling cord obtained in accordance with Example 28 is pressed into a 1.5 cm wide gap in an expanded concrete brick in such a way that no material projects beyond the surface of the brick. The gap is then exposed upright to the flame of a Bunsen burner arranged substantially horizontally in accordance with Example 32. The intumescent material undergoes vigorous foaming in the gap. After 60 minutes the flame is still not broken through.

EXAMPLE 35

The reaction mixture produced in accordance with Example 27 is introduced into and foamed in conical beaker molds impregnated with wax. After about 10 minutes, the conical moldings are removed from the molds. The moldings are used for the fire-retardant sealing of more or less round holes in light walls or of pipe ends by first being compressed, introduced into the holes in the compressed state and then allowed to expand again. After sealing in this way, the openings in question are impervious to smoke gas.

EXAMPLE 36

A reaction mixture is prepared in the same way as in Example 28, but without any water. The reaction is over after about 5 minutes. A viscous, rubber-like material is obtained, being characterized by outstanding intumescent properties in the flame test in which it does not continue burning.

A reaction mixture corresponding to Example 29 may also be hardened in the same way, i.e. without the addition of water, to form a solid, flexible rubber-like intumescent material. This material is distinguished from the melamine-containing mixture mentioned above by distinctly more intensive foaming on exposure to a flame.

If such a reaction mixture is applied to the surface of a steel plate before hardening, it hardens thereon to form a rubber-like coating characterized by good adhesion and intumescence so that the underlying steel is protected against fire.

The rubber-like intumescent compositions may also be used for the production of protective electrical cable sheaths or hoses. Introduced into electrical cables, they form a flexible protective barrier against fire.

What is claimed is:

1. Intumescent compositions, which may be foamed, and which are obtained by reacting:
   (1) polyisocyanates with
   (2) phosphorus-containing condensation products having at least one hydroxy group obtainable by condensing (i) primary or secondary aliphatic, cycloaliphatic, aromatic, araliphatic or heterocyclic monoamines and/or polyamines, which mono- or polyamines may contain OH-groups; (ii) carbonyl compounds; and, (iii) dialkyl phosphites, and (3) polyesters containing hydroxyl groups and having OH-numbers of from 140 to 300, obtained by reacting polycarboxylic acids containing from 2 to 10 carbon atoms with at least 2 polyols selected from two different groups of the following three:
 (a) hydroxyl compounds containing more than three OH groups and having molecular weights of up to 200,
 (b) hydroxyl compounds containing three OH groups and having molecular weights of up to 150,
 (c) hydroxyl compounds containing two OH-groups and having molecular weights of up to 80, with the proviso that at least one polyol is selected from group (a), and (4) cyanuric acid and/or cyanuric acid derivatives and (5) optionally water and/or other organic compounds containing isocyanate-reactive hydrogen atoms.

2. The composition of claim 1 wherein, following condensation, said component (2) is alkoxylated.

3. The compositions of claim 1 obtained by reacting from 10 to 35 parts, by weight, of a polyisocyanate with 100 parts, by weight, of a mixture comprising from 5 to 50%, by weight, of phosphorus-containing condensation products, from 30 to 70%, by weight of polyesters, from 7 to 40%, by weight of cyanuric acid and/or derivatives, from 0 to 10%, by weight, of water, and from 0 to 25%, by weight, of other organic compounds containing isocyanate-reactive hydrogen atoms.

4. The composition as of claim 1, characterized in that said polyisocyanate is of the type obtained by phosgenating aniline/formaldehyde condensates.

5. The composition of claim 1, characterized in that the phosphorus compound corresponds to the following formula:

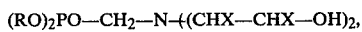

wherein
R represents $C_1$–$C_8$ alkyl or $C_1$–$C_8$ hydroxyalkyl; and
X represents H or methyl.

6. The composition of claim 1, characterized in that a highly branched polyester of adipic acid, pentaerythritol, glycerol and ethylene glycol is used as the polyesters.

7. The composition of claim 1, characterized in that melamine is used as the cyanuric acid derivative.